United States Patent Office

3,139,390
ENZYME SOURCE
Samuel A. Matz, 6 Huckleberry Lane, Liverpool, N.Y.
No Drawing. Filed Sept. 6, 1962, Ser. No. 221,892
4 Claims. (Cl. 195—67)

This invention relates to the selective inhibition of metabolic processes in a living cell and has particular reference to the treatment of yeast cells to inactivate metabolic processes dependent upon the cytoplasmic enzymes and enzyme factors without inactivating the enzymes bound to the cell wall.

Among the enzyme and enzyme factors present in the cytoplasim are those responsible for alcoholic fermentation. Among the most important of the cell wall enzymes are invertase, maltase, and pyrophosphatase. Yeast is used commercially in the production of alcoholic and bakery products, among others, where its known fermentative powers are desired. However, in certain instances the non-fermentative enzyme present in the cell wall are desired, as in the inversion of sugar syrups with invertase present in yeast cell walls. The use of yeast cells in such circumstances is unsatisfactory due to the undesired fermentation of the substrate by the fermentative enzymes present in the cytoplasim. As used herein the term "fermentation" means alcoholic fermentation.

Attempts to autolyze or extract the yeast in order to obtain the desired cell wall enzymes have not been satisfactory. In the case of autolysis, the result is a solution containing the desired cell wall enzymes, the undesired flavoring and odorous substances present in the yeast, and, most importantly, the soluble fermentative enzymes. Extended processing is then required in order to separate the cell wall enzymes.

In like manner, extraction with solvents such as acetone is unsatisfactory. Such preparations are non-viable and contain some of the fermentative enzymes which retain appreciable activity while some of the desired cell wall enzymes are inactivated. Furthermore, such preparations will autolyze when brought into aqueous suspension with liberation of substances giving again, unpleasant tastes and aromas.

One important and fundamental defect in the use of fractions obtained by either autolysis or extraction is that the cell wall enzymes are not attached to particulate matter but are in a soluble form. This results in not being able to physically remove the enzyme from the substrate except by heating so as to inactivate the enzyme. This not only adversely affects the substrate, but leaves a residue of foreign matter in the product; namely, the precipitated enzyme. The ease of removing an enzyme attached to particulate matter is of particular importance in instances where the enzyme activity must be halted at a certain point as in the case of selective inversion of sugar.

The present invention eliminates the drawbacks of previous procedures by providing as a source of non-fermentative enzymes a non-autolyzing yeast cell in which the fermentative and oxidative processes of the cytoplasm are inactivated.

Briefly stated, the present invention comprises the process of lowering the moisture content of the yeast cells to at least about 3% and extracting the yeast cells with an aqueous solution at a temperature of about 0° to about 10° C. The invention also comprises the product resulting from said process and the process of using such yeast cells in the selective hydrolysis of sucrose, maltose, and pyrophosphate.

The yeast cells used can be any commercially available material such as dry bakers' yeast, brewers' yeast, and compressed yeast cakes. While any of the organisms of the tribe Saccharomyceteae can be used it is commercially desirable to use yeast of the genus Saccharomyces, and preferably the readily available Saccharomyces cerevisiae. Instead of the dried yeast or other commercially available yeasts, the desired organisms can be obtained by culturing.

The aqueous solution used to extract the yeast is preferably water (i.e., tap water). Moderate amounts of salts such as sodium chloride, sodium, phosphate, and potassium chloride do not interfere with the action of the water. The amount of aqueous solution used must be sufficient to thoroughly extract the material from the yeast. It is preferred to use 10 to 40 parts by weight of water for every part by weight of yeast.

Of importance are the moisture content of the yeast cell prior to extraction and the temperature of the cell wall at time of extraction. Both of these are closely interrelated and must be within the limits set forth hereinbelow.

The moisture content of the yeast cell prior to extraction must be less than 3%, and preferably 2.5%. Lower moisture contents are operative but commercially uneconomical.

The extraction must occur at temperature of about 0° to about 10° C., and preferably 1° C. It is also preferred to cool the yeast to this temperature range prior to extraction in order to insure that the temperature of the cell membrane is at the stated temperature range. The extracting solution should be preferably chilled water having a temperature of about 0° to about 10° C.

While the precise reason for the selective inactivation is not understood, it is believed that the interaction of the water with the yeast cell when the yeast cell wall is at a temperature below 10° C. and the yeast has a moisture content below 3% results in the formation of "gaps" in the semi-permeable cell membrane, permitting the leaching out of the cytoplasmic enzyme and enzyme factors. This inhibits and inactivates the fermentative and oxidative cytoplasmic enzymes. Attempts to use cold water without the low moisture content of the yeast have been ineffective and is believed that this is because the cell membrane retains its integrity in such cases and does not permit the leaching out of the cytoplasmic enzymes and co-factors. It is only the combination of low moisture content and temperature of extraction that will affect the cell membrane to permit removal of the coenzymes, soluble enzymes, and inorganic co-factors.

The extracted yeast is then separated from the extracting water, as by centrifugation or by placing the complete mixture through a Büchner funnel. It is preferred to wash the yeast cells with water in order to remove any of the soluble materials that may have become adhered to the exterior of the yeast cells.

The yeast may be then compressed into cakes or dried in the usual manner to a moisture content of about 8% with or without the addition of fillers that are sometimes used with dried yeast.

The viable, non-autolyzed yeast cells with active cell wall enzymes can be used to invert sucrose syrups, to reduce the molecular weight of corn syrup digests, to liberate phosphoric acid from pyrophosphate salts in baking solutions and in other applications where there is need of such enzymes without the interfering and undesirable alcohol fermentation or oxidative changes.

The use of viable yeast cells of the present invention have a further advantage in that they are readily removable from the substrate. Heretofore, when a source of invertase, such as the enzyme itself, has been used it has been necessary to inactivate the enzyme by heating the substrate once the inversion has reached the desired point. The undesirability of heating the substrate is evident and has been discussed earlier. In the instant case inversion can be accomplished by adding the viable yeast cells of the present invention and, when the desired degree of inversion is obtained, physically removing the yeast to stop any further inversion. This removal can be accomplished by simple centrifugation or filtration without affecting any changes in the inverted sugar solution.

The use of the viable yeast cells also has the further advantage over the autolyzed sources of enzymes in that they do not contain any of the soluble enzymes or flavoring and odorous substances that are intermingled with the enzymes after yeast has been autolyzed. This eliminates undesirable side reactions which may occur because of this contamination. Also the viable yeast cells can be reused.

The invention will be further illustrated by the following specific examples. Proportions in these examples and elsewhere herein are expressed as parts by weight unless specifically stated to the contrary.

*Example 1*

Commercial active dry bakers' yeast (*Saccharomyces cerevisiae*) containing about 7.8% moisture was dried to 2.1% moisture by vacuum desiccation. The yeast was then cooled to a temperature of about 3° C. and 20 parts of water at 3° C. were added for each part by weight of the yeast. The mixture was then agitated for 5 minutes and the yeast suspension centrifuged at 1500 g. for 30 minutes. The supernatant was decanted and discarded and the residue was washed with 20 parts of cold water and recovered by centrifugation. The yeast was then dried over calcium chloride at room temperature to a moisture content of about 8%.

When tested with Warburg apparatus for fermentation capacity against glucose, negligible gas evolution was detected as opposed to a rate of about 13,900 microliters of gas per gram given by the same yeast under the same conditions, but prior to treatment as set forth above. The treated yeast was tested for invertase activity using Warburg apparatus and sucrose in conjunction with a glucose oxidase-catalase combination which gave an uptake of oxygen when glycose was presented to the system. It was found that the enzyme catalyzed production of at least 0.31 mm. of glucose per minute per gram of yeast.

*Example 2*

A 500 parts of a solution of sucrose (66% sucrose) was treated with 1 part of the dried yeast of Example 1. The yeast was admixed with the sucrose solution and allowed to react for 15 minutes at 30° C. The yeast cells were then removed by use of a centrifugal separator which removed the yeast from the top and the inverted sugar from the bottom. The resultant syrup was at least 80% converted to invert sugar. The yeast cells were found to be still viable and were used again on a second batch of sucrose solution with a slight increase in reaction time noted due to a very slow inactivation of the invertase.

*Example 3*

A sugar solution of about 66% sucrose was inverted as set forth in Example 2 with the exception that the yeast was only allowed to act until the sugar was 60% inverted. This took approximately 10 minutes. At that time the yeast cells were removed from the sugar solution and no further inversion was detected.

In both Examples 2 and 3, no alcoholic fermentation was detected, nor was there any off-flavor in the resultant syrup.

It will be understood that it is intended to cover all changes and modifications of the examples of the invention herein chosen for the purpose of illustration which do not constitute departures from the spirit and scope of the invention.

I claim:

1. The method of inactivating the cytoplasmic enzyme and enzyme factors of viable yeast cells without autolyzing the same and inactivating enzymes bound in the cell wall thereof, comprising the steps of lowering the moisture content of the cells to at least about 3%, and extracting the cells with an aqueous solution at a temperature of from about 0° to about 10° C.

2. The method as set forth in claim 1 in which the extracted yeast cells are separated from the aqueous solution, washed with water to remove any adherent extracted material and dried to a moisture content below about 10%.

3. The method of inactivating the cytoplasmic enzyme and enzyme factors of viable cells of *Saccharomyces cerevisiae* without autolyzing the same and inactivating enzymes bound on the cell wall thereof, comprising the steps of lowering the moisture content of the cells to at least about 3%, adjusting the temperature of the cell walls of the cells to from about 0° to about 10° C., and extracting the cells with water at a temperature of from about 0° C. to about 10° C.

4. The method of inverting sugar substrates with viable yeast cells in the absence of alcoholic fermentation which comprises adding a viable yeast preparation made in accordance to the method as set forth in claim 1 to a sugar solution, and separating the yeast preparation from the inverted sugar solution when the desired degree of inversion is reached.

References Cited in the file of this patent

UNITED STATES PATENTS 1,893,152     Schultz et al. _____ Jan. 3, 1933

UNITED STATES PATENT OFFICE
CERTIFICATE OF CORRECTION

Patent No. 3,139,390 June 30, 1964

Samuel A. Matz

It is hereby certified that error appears in the above numbered patent requiring correction and that the said Letters Patent should read as corrected below.

Column 4, line 36, for "on" read -- in --.

Signed and sealed this 20th day of April 1965.

(SEAL)
Attest:

ERNEST W. SWIDER
Attesting Officer

EDWARD J. BRENNER
Commissioner of Patents